UNITED STATES PATENT OFFICE.

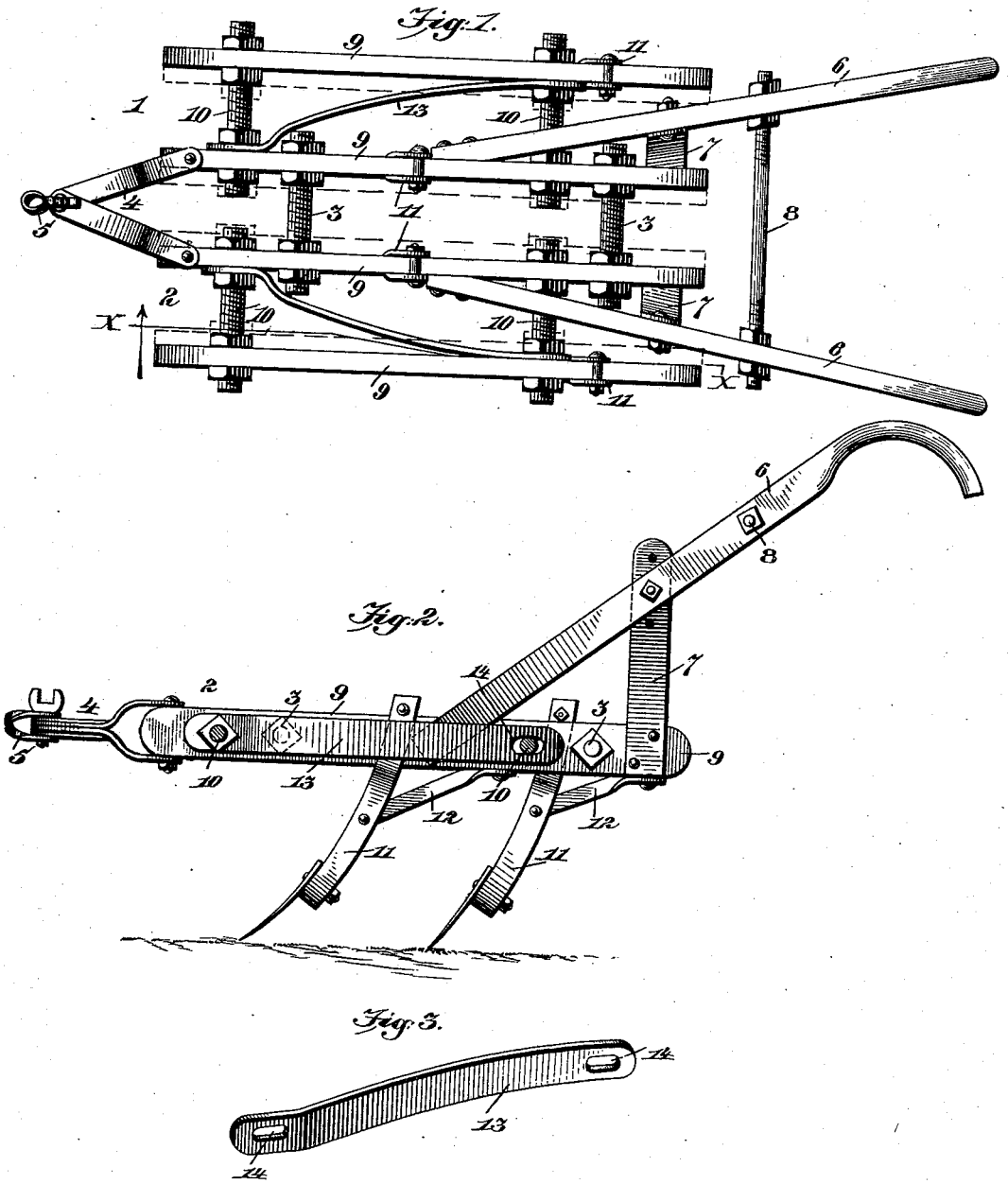

WILLIAM M. MOORE, OF LUFKIN, TEXAS.

EXPANSION-CULTIVATOR.

SPECIFICATION forming part of Letters Patent No. 578,348, dated March 9, 1897.

Application filed November 4, 1896. Serial No. 611,055. (No model.)

*To all whom it may concern:*

Be it known that I, WILLIAM M. MOORE, a citizen of the United States, residing at Lufkin, in the county of Angelina and State of Texas, have invented a new and useful Expansion-Cultivator, of which the following is a specification.

This invention relates to cultivators, and has for its object to provide an implement of this kind which can be readily expanded or contracted to adapt the device to the distance apart of the rows to be cultivated or to cover a tract of greater or less breadth.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a cultivator constructed in accordance with and embodying the principles of this invention. Fig. 2 is a longitudinal section on the line X X of Fig. 1, looking in the direction of the arrow. Fig. 3 is a detail view of a spring-brace interposed between the longitudinal bars of a section.

Corresponding and like parts are referred to in the following description and indicated in the several views of the drawings by the same reference-characters.

The cultivator is composed of similar sections 1 and 2, which are adjustably connected together by tie-rods 3, provided at their ends with pairs of nuts, between which the inner longitudinal bars are clamped in an adjusted position. The draft-bars 4 have pivotal connection at their rear ends with the inner longitudinal bars of the sections, and their front ends are connected to a clevis 5, to which the team is hitched for drawing the implement over the field. The handles 6 are secured at their lower ends to the said inner longitudinal bars of the sections, and have adjustable connection with braces 7, rising from the said bars, and are adjustably connected by a cross-rod 8, which is threaded at its ends and provided with pairs of nuts, between which the said handles are clamped to hold them in the required position. When it is required to vary the distance between the sections 1 and 2, the clamp-nuts at the ends of the tie-rods 3 are loosened, one nut of each pair being backed and the other advanced until the required adjustment is attained, when by tightening the said nuts the parts will be held in the adjusted position. A similar operation is performed when it is required to separate or bring the handles closer together.

The sections 1 and 2 are constructed substantially alike, each comprising a pair of longitudinal bars 9, which are adjustably connected together by tie-rods 10, similar in construction to the tie-rods 3, and provided at their ends with pairs of nuts, between which the longitudinal bars are clamped to hold them in the located position. Standards 11, bearing suitable shovels or cultivating-blades, are attached to the longitudinal bars 9 and are strengthened by braces 12. A spring-brace 13 is interposed between the longitudinal bars of each section and extends diagonally between them. The ends of this spring-brace have openings for the passage therethrough of the tie-rods 10, and these openings 14 are elongated to admit of the longitudinal bars being adjusted laterally, as will be readily understood. The normal tendency of these spring-braces is to force the longitudinal bars apart when the clamp-nuts are loosened, thereby obviating the necessity for moving the bars by a subsequent action after loosening the nuts, thereby providing for the adjustment being effected in a comparatively short time and with ease. These braces 13 strengthen the implement and at the same time provide means for spreading the bars when the clamp-nuts are loosened sufficiently to increase the width of the implement.

Having thus described the invention, what is claimed as new is—

1. In a cultivator, the combination with a pair of longitudinal bars bearing cultivating devices, and tie-rods provided with clamp-nuts for adjusting the said bars laterally, of a spring-brace interposed between the said bars for strengthening the implement and serving as a means to spread the said bars when the connecting means are loosened, substantially as set forth.

2. In a cultivator, the combination with a pair of longitudinal bars bearing cultivating devices, and tie-rods having clamp-nuts for laterally adjustably connecting the said bars, of a spring-brace extending diagonally between the said bars and having elongated openings at its ends to receive the tie-rods, substantially as and for the purpose set forth.

3. The herein-described cultivator, comprising independent sections of similar construction, tie-rods having clamp-nuts for adjustably connecting the said sections, draft-bars applied to the inner bars of the sections, handles secured at their lower ends to the said inner bars, means for adjustably connecting the handles, diagonally-disposed spring-braces interposed between the longitudinal bars of each section, and tie-rods for connecting the bars of the sections, substantially as and for the purpose set forth.

In testimony that I claim the foregoing as my own I have hereto affixed my signature in the presence of two witnesses.

WILLIAM M. MOORE.

Witnesses:
B. F. NEAREN,
N. D. WRIGHT.